Sept. 10, 1935. C. GIRL 2,014,019
ATTACHMENT FOR COUPES
Filed June 3, 1935 2 Sheets-Sheet 1
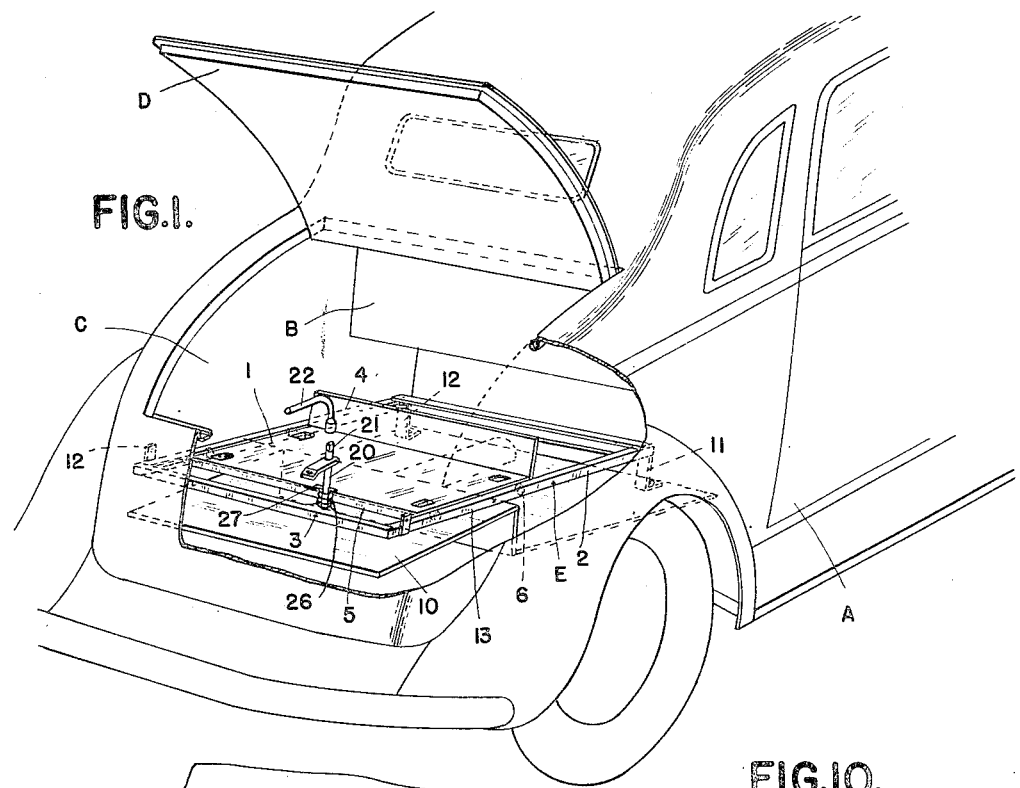
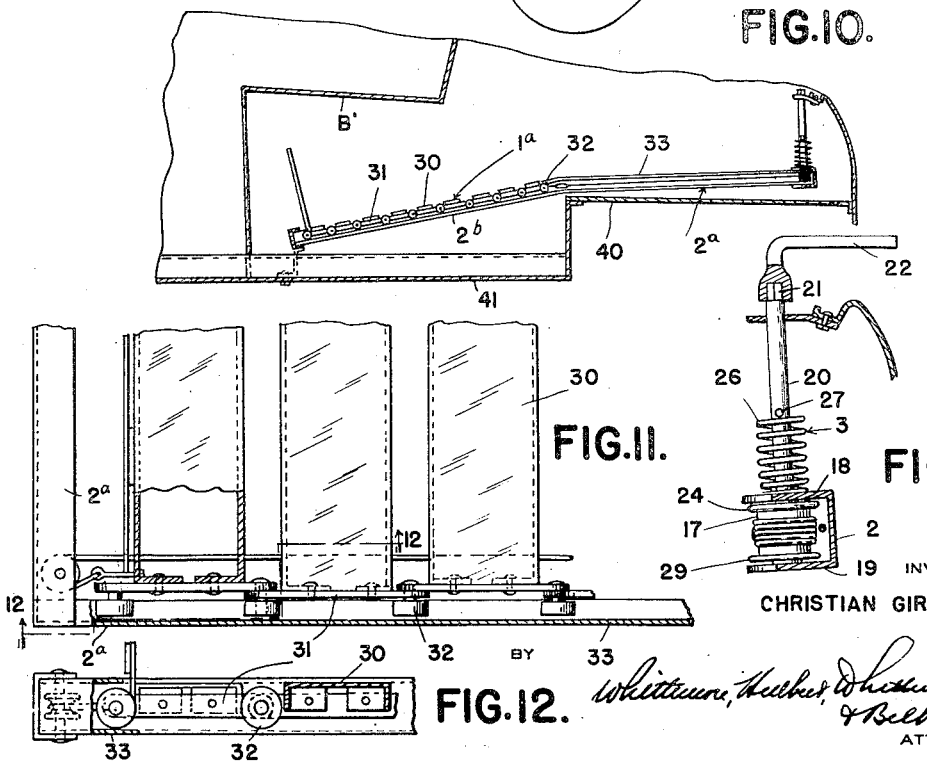
INVENTOR
CHRISTIAN GIRL
ATTORNEYS Sept. 10, 1935.   C. GIRL   2,014,019
ATTACHMENT FOR COUPES
Filed June 3, 1935   2 Sheets-Sheet 2
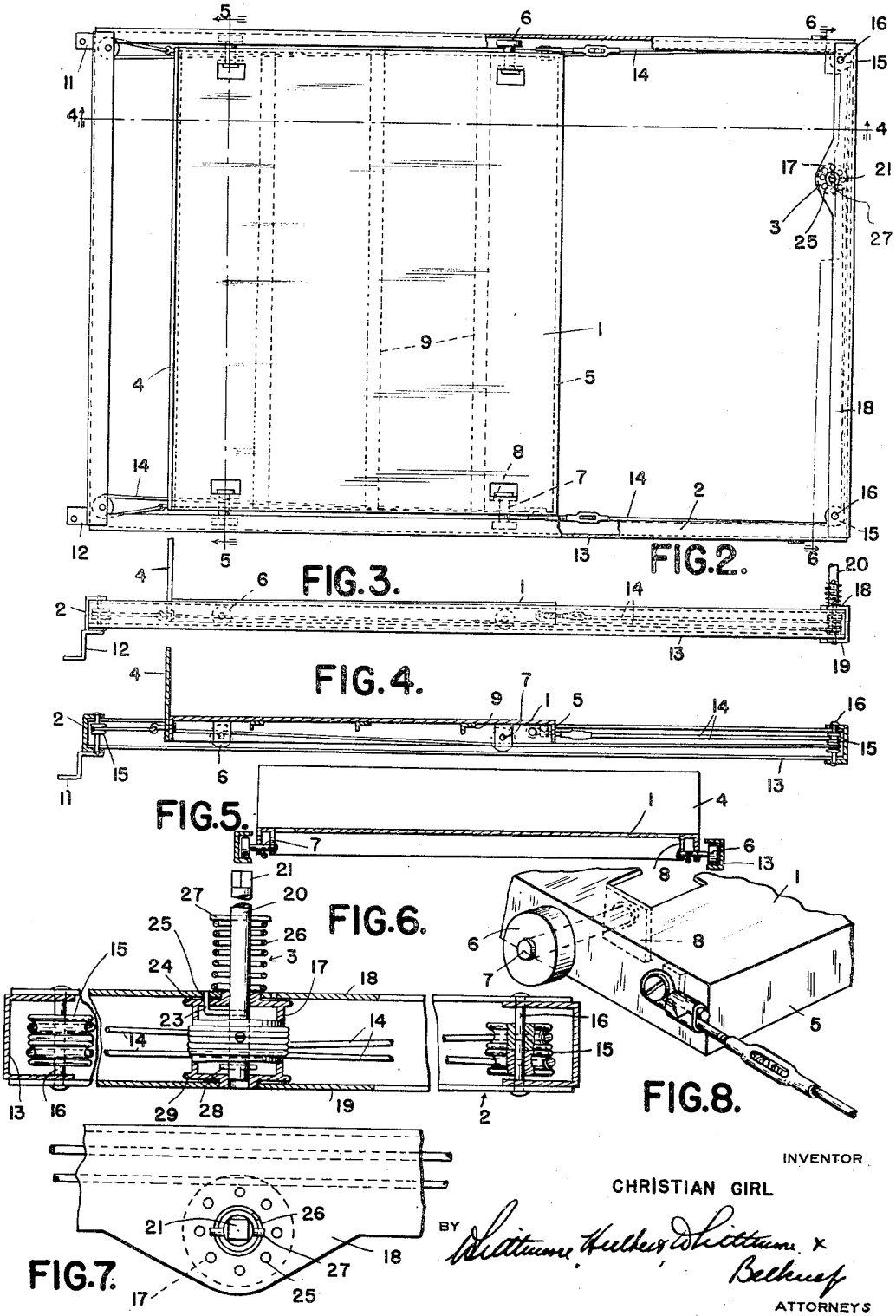
INVENTOR
CHRISTIAN GIRL
BY
ATTORNEYS Patented Sept. 10, 1935

2,014,019

UNITED STATES PATENT OFFICE 2,014,019

ATTACHMENT FOR COUPES

Christian Girl, Detroit, Mich.

Application June 3, 1935, Serial No. 24,761

3 Claims. (Cl. 296—37)

This invention relates generally to attachments for automobiles and refers more particularly to attachments for the rear decks or storage compartments of coupes.

Usually the spare tire or wheel with a tire thereon is carried at the rear end of a coupe in rear of the deck so that it has been necessary to either bend way over such tire or wheel while standing on the ground or to climb upon the rear bumper or some other part of the car to load or unload the rear deck or storage compartment thereof. Often times the person doing the loading or unloading would strike his head against the deck lid or closure when in opened raised position or would slip on the bumper or other part of the car upon which he claimed. When standing on the bumper, it was very hard to get the articles to be loaded up under the driver's seat toward the front of the deck and doubly hard to get them out. Moreover, aside from the risk of slipping, there was always the likelihood of soiling one's clothing when leaning over the spare tire or when climbing in and out of the deck.

Therefore, it is an object of the present invention to obviate the difficulties just mentioned by providing in the deck or compartment a carrier for the articles or goods which may be easily and conveniently loaded or unloaded from the ground.

Another object is to provide a carrier of the type referred to that may be readily moved forwardly in the deck after being loaded so that space within the deck in rear of the carrier may be used for carrying additional articles.

Another object is to provide a carrier that may be readily moved rearwardly in the deck to an accessible position when it is desired to unload the same.

Another object is to provide a carrier that can be retained in any adjusted position longitudinally of the deck.

Another object is to provide the carrier with a track or other suitable mounting which may be easily and quickly installed within the deck.

Another object is to provide the carrier with actuating mechanism which may be easily and quickly operated.

Another object is to provide an attachment of the character described that can be manufactured at a comparatively low cost.

Other objects, advantages and novel details of construction of this invention will be made more apparent as this description proceeds, especially when considered in connection with the accompanying drawings, wherein:

Figure 1 is a fragmentary perspective view of a coupe with parts broken away and in section, showing the deck lid raised and loading and unloading means embodying my invention mounted within the deck;

Figure 2 is a top plan view of the loading and unloading means;

Figure 3 is a side elevation of the loading and unloading means;

Figure 4 is a sectional view taken substantially on the line 4—4 of Figure 2;

Figure 5 is a sectional view taken substantially on the line 5—5 of Figure 2;

Figure 6 is a fragmentary sectional view taken substantially on the line 6—6 of Figure 2;

Figure 7 is a fragmentary plan view of a rear portion of the loading and unloading means;

Figure 8 is a fragmentary perspective view of the carrier and associated parts;

Figure 9 is a fragmentary vertical sectional view through the rear deck of the coupe and loading and unloading device, and showing the crank used for manipulating said device in an operative position;

Figure 10 is a fragmentary longitudinal vertical sectional view through the coupe and showing a slightly modified construction;

Figure 11 is a fragmentary top plan view of the construction illustrated in Figure 10;

Figure 12 is a fragmentary sectional view taken substantially on the line 12—12 of Figure 11.

Referring now to the drawings, A is a coupe having a front seat B, and a rear deck or storage compartment C provided with a suitable hingedly mounted lid or closure D. E is an attachment embodying my invention mounted within the compartment C and preferably comprising an article carrier 1, a supporting frame 2 therefor, and mechanism 3 for actuating the carrier and holding the same in any adjusted position longitudinally of said compartment.

As shown, the carrier 1 comprises a substantially flat platform of sheet metal or other suitable material having an upstanding back stop 4 at its rear end and having depending flanges 5 at its edges. Upon the outer sides of the side flanges are supporting rollers 6 which are preferably mounted on stub shafts 7 anchored in the side flanges 5 and depending struck-out tongues 8 of the platform. Any suitable means such as the angle bars 9 may be used on the underside of the platform between the depending flanges 5 thereof for strengthening purposes.

The supporting frame 2 is preferably rectangular-shaped and is formed of structural elements such as channel bars or rails. Preferably the frame 2 is rigidly mounted within the deck C just above the floor 10 thereof in a slightly inclined position, suitable brackets 11 and 12, respectively, being used at the forward and rear ends thereof as desired to insure the proper mounting. As shown, the channel bars of the frame open inwardly so that the channels of the side bars 13 will serve as a track for the rollers 6 at opposite sides of the carrier.

The mechanism 3 for actuating the carrier 1 preferably comprises suitable flexible cables 14 fastened to the carrier 1 at its front and rear ends and trained around sheaves 15 carried by upstanding shafts 16 at the four corners of the supporting frame 2. These cables 14 are also trained around a drum 17 rotatably mounted in the upper and lower sides 18 and 19 of the rear -channel bar of the frame. For turning the drum 17 is a vertical shaft 20 having a squared upper end 21 which may be engaged by any suitable means such as a crank 22. Preferably this shaft 20 is mounted to move axially of the drum 17 and is connected thereto by a substantially L-shaped pin 23. As shown, the pin 23 extends through the top 24 of the drum and is engageable with any one of a series of holes 25 in the upper side 18 of the rear channel bar of the frame. Normally the pin 23 is held in such engagement by a coil spring 26 sleeved on the shaft 20 between the upper side 18 of the channel bar and a transversely extending pin 27 carried by the shaft. A second transversely extending pin 28 is carried by the shaft 20 adjacent its lower end for engagement with the bottom 29 of the drum to limit downward movement of the shaft 20 against the tension of the spring 26. Thus, when it is desired to move the carrier 1 longitudinally of the compartment C, the shaft 20 may be depressed in the drum 17 by the crank 22 so that the pin 23 will be disengaged from the hole 25 with which it had been engaged, and then while depressed may be turned by the crank 22 so that the drum 17 will actuate the cables 14 and carrier 1. When the carrier 1 reaches the position desired, the downward pressure on the shaft 20 by the crank 22 may be released so that the pin 23 may engage another hole 25 in the rear cross bar of the frame and thereby hold the carrier in adjusted position.

In Figures 10 to 12, inclusive, I have illustrated a slight modification wherein the carrier 1a comprises a series of slats 30 secured at their ends to pivotally connected links 31 carrying rollers 32 which engage the channel-shaped side bars 33 of a frame 2a. As shown, the forward portion 2b of this frame inclines downwardly from a point just in front of the higher portion 40 of the deck to a point adjacent the bottom of the lower portion 41 of said deck and thus provides more space between the carrier 1a and driver's seat B' for articles to be transported. Otherwise, the construction and arrangement of parts are substantially the same as in Figures 1 to 9, inclusive.

Thus, from the foregoing, it will be apparent that I have provided a very efficient and practical carrier which may be easily and conveniently loaded or unloaded without climbing upon a rear bumper or other part of the vehicle. In other words, the carrier may be readily manipulated and loaded and unloaded by one person from either side of the coupe while such person is standing on the ground. After the carrier has been loaded in its rearward position, it may be moved forwardly under the seat of the coupe so that the space in the compartment at the rear of the carrier may be loaded. When unloading, the articles are removed first from the space within the compartment at the rear of the carrier and then the carrier is moved rearwardly and unloaded. The supporting frame including the track for the carrier may be at any slant in the compartment that would be practical. Moreover, if the carrier is formed of slats such as 30, then the frame may be irregular or curved in configuration as desired. Preferably the rollers of the carrier are formed of rubber or any suitable material which will be soundproof. As shown, the side bars of the frame forming the track for the carrier are channel-shaped and thus not only provide a runway for the rollers, but also prevent them from bouncing upwardly off such runway. Any other form of frame or track that would produce these results may be employed, and any suitable material may be used in the construction thereof. Likewise, the means for holding the carrier in any adjusted position may have various modifications which would fall within the scope of my invention. Thus, the invention broadly construed resides in any suitable means for facilitating the loading and unloading of the rear deck or storage compartment of a coupe, and especially the forward portion thereof under the driver's seat.

What I claim as my invention is:

1. A loading and unloading device for a rear compartment of a coupe type vehicle, said compartment having a relatively inaccessible forward end, comprising an article carrier movable lengthwise of said compartment from substantially one end to the other thereof and provided with supporting rollers, a substantially rectangular frame rigidly mounted within said compartment and substantially parallel with the floor thereof, opposite sides of said frame opening inwardly and being substantially U-shaped in cross section and forming runways for said rollers, and means for moving said article carrier lengthwise of said compartment including a drum carried by said frame at the rear end thereof, sheaves carried by said frame at the corners thereof, and cables trained around said sheaves and connected respectively to said drum and article carrier.

2. A loading and unloading device for a rear compartment of a coupe type vehicle, said compartment having a relatively inaccessible forward end, comprising an article carrier movable lengthwise of said compartment from substantially one end to the other thereof and provided with supporting rollers, a substantially rectangular frame rigidly mounted within said compartment and substantially parallel with the floor thereof, opposite sides of said frame forming runways for said rollers, and means for moving said article carrier lengthwise of said compartment including a rotatable element carried by said frame at the rear end thereof, sheaves carried by said frame at the corners thereof, and flexible elements trained around said sheaves and connected respectively to said rotatable element and article carrier.

3. A loading and unloading device for a rear compartment of a coupe type vehicle, said compartment having a relatively inaccessible forward end, comprising an article carrier movable lengthwise of said compartment from substantially one end to the other thereof and provided with supporting rollers, a substantially rectangular frame rigidly mounted within said compartment and substantially parallel with the floor thereof, opposite sides of said frame forming runways for said rollers, and means for moving said article carrier lengthwise of said compartment including rotatable elements at opposite ends of the frame, and flexible means trained around said rotatable elements and connected respectively to one of said elements and to said article carrier.

CHRISTIAN GIRL.